US 6,580,799 B1

(12) United States Patent
Azima et al.

(10) Patent No.: US 6,580,799 B1
(45) Date of Patent: *Jun. 17, 2003

(54) KEYBOARD COMPRISING A LOUDSPEAKER

(75) Inventors: Farad Azima, London (GB); Martin Colloms, London (GB)

(73) Assignee: New Transducer Limited, London (GB)

(*) Notice: Subject to any disclaimer, the term of this patent is extended or adjusted under 35 U.S.C. 154(b) by 230 days.

This patent is subject to a terminal disclaimer.

(21) Appl. No.: 09/692,479

(22) Filed: Oct. 20, 2000

Related U.S. Application Data

(63) Continuation-in-part of application No. 08/707,012, filed on Sep. 3, 1996, now Pat. No. 6,332,029.
(60) Provisional application No. 60/164,269, filed on Nov. 9, 1999.

(30) Foreign Application Priority Data

| Sep. 2, 1995 | (GB) | ............................................. 9517918 |
| Oct. 31, 1995 | (GB) | ............................................. 9522281 |
| Mar. 30, 1996 | (GB) | ............................................. 9606836 |
| Oct. 22, 1999 | (GB) | ............................................. 9924932 |

(51) Int. Cl.$^7$ ............................................. H04R 25/00
(52) U.S. Cl. ..................... 381/333; 381/152; 381/190; 381/388; 345/168; 345/169
(58) Field of Search .................. 381/306, 333, 381/388, 152, 190, 191, 431; 361/680; 345/168–169, 156; 84/744

(56) References Cited

U.S. PATENT DOCUMENTS

| 5,682,290 | A | | 10/1997 | Markow et al. | ............. 361/683 |
| 5,732,140 | A | | 3/1998 | Thayer | ........................ 381/24 |
| 5,828,768 | A | | 10/1998 | Eatwell et al. | ............. 381/333 |
| 5,892,503 | A | | 4/1999 | Kim | ........................... 345/168 |
| 5,930,376 | A | | 7/1999 | Markow et al. | ............. 381/333 |
| 6,332,029 | B1 | * | 12/2001 | Azima et al. | ................ 381/152 |
| 6,399,870 | B1 | * | 6/2002 | Azima et al. | .................. 84/744 |

FOREIGN PATENT DOCUMENTS

| EP | 0 886 457 | 12/1998 |
| WO | WO 98/43464 | 10/1998 |

* cited by examiner

Primary Examiner—Curtis Kuntz
Assistant Examiner—Suhan Ni
(74) Attorney, Agent, or Firm—Foley & Lardner

(57) ABSTRACT

A keyboard (40) having a bending wave loudspeaker (46) comprising an acoustic radiator capable of supporting bending waves and a transducer (48) mounted on the acoustic radiator to excite bending waves in the acoustic radiator to produce an acoustic output. The keyboard comprises a housing (38) having a lid (36) supporting individual keys (14) or a touchpad. The loudspeaker (46) may be integrally formed with the base (42) of the housing of the loudspeaker, or, if a touchpad is used, may be integral with the touchpad. The acoustic radiator may be a resonant mode bending wave radiator.

36 Claims, 2 Drawing Sheets

KEYBOARD COMPRISING A LOUDSPEAKER

This application claims the benefit of provisional application No. 60/164,269, filed Nov. 9, 1999; and is a continuation-in-part of application Ser. No. 08/707,012, filed Sep. 3, 1996 now U.S. Pat. No. 6,332,029.

TECHNICAL FIELD

The invention relates to keyboards as used, for example, in typewriters and computers.

BACKGROUND ART

It is known to provide loudspeakers in the keyboard of a computer. See, for example, U.S. Pat. Nos. 5,682,290 and 5,892,503. Space is at a premium in a keyboard and thus small loudspeakers must be used. However, conventional pistonic loudspeakers which are small enough to fit in such confined areas are generally incapable of producing an acoustic output with a wide frequency range such as is required for music or speech reproduction. Generally, the frequency range of such small loudspeakers is limited and thus the loudspeakers produce no more than a few simple tones, e.g. bell rings or bleeps.

SUMMARY OF THE INVENTION

It is an object of the present invention to provide a keyboard of enhanced acoustic functionality.

A keyboard comprising a bending wave loudspeaker comprising an acoustic radiator capable of supporting bending waves and a transducer mounted on the acoustic radiator to excite bending waves in the acoustic radiator to produce an acoustic output. The keyboard has a housing comprising a base, and support means for supporting the base above a work surface on which the keyboard is placed to define a gap between the base and the work surface. The bending wave loudspeaker is positioned in the housing so that its acoustic output is transmitted to a user via the gap between the base and the work surface. A user interface is carried by the housing above the base.

The loudspeaker may be a resonant bending wave mode loudspeaker comprising an acoustic radiator capable of supporting resonant bending wave modes and a transducer mounted on the acoustic radiator to excite resonant bending wave modes in the acoustic radiator to produce an acoustic output.

Such a resonant bending wave mode loudspeaker is described in WO98/09842 and other patent applications and publications, including U.S. patent application Ser. No. 08/707,012, filed Sep. 3, 1996 (incorporated herein by reference in its entirety), and may be referred to as a distributed mode loudspeaker.

The keyboard may comprise two loudspeakers, for example, a right and a left channel for stereo audio reproduction.

The keyboard may be a stand-alone device connected, for example, to a computer and monitor by an electrical cable or lead. The support means may be in the form of feet so that the base may be raised above the work surface on which the keyboard is placed. The whole, or alternatively only part, of the base may not be in contact with the rest surface when the base is raised on the feet.

The or each loudspeaker may be integrally formed with the base of the housing or may be a separate unit mounted in the base of the housing. The housing may further comprise side walls and a top defining with the base a cavity in the housing. Alternatively, the or each loudspeaker may be mounted inside the cavity. The or each loudspeaker may be supported on a mounting which may be either resilient or rigid. The base of the housing may be acoustically transparent to allow acoustic output from the loudspeaker to be transmitted to a user. The base of the housing may comprise a grid, a pierced panel or acoustically porous mounting.

One property of a distributed mode radiator is the diffuse nature of the propagation of acoustic output from the radiator. Accordingly, although the or each loudspeaker is located on the base of the housing or in the housing whereby sound is primarily transmitted though the base, the acoustic output circulates to the user. In particular, when the base is raised from the work surface, acoustic output may reflect off the work surface to the user.

There is generally positive interference between the reflected acoustic output and the radiated acoustic output which may improve the performance of the loudspeaker. In contrast, if a conventional loudspeaker were to be mounted in the base of the keyboard or inside the keyboard with the only sound radiation from the base of the keyboard, the reflected acoustic output and the radiated acoustic output would destructively interfere. Thus such an arrangement is unlikely to be possible with a conventional pistonic loudspeaker.

The properties of the acoustic radiator may be chosen to distribute the resonant bending wave modes substantially evenly in frequency. In other words, the properties or parameters, e.g. size, thickness, shape, material etc., of the acoustic radiator may be chosen to smooth peaks in the frequency response caused by "bunching" or clustering of the modes. The resultant distribution of frequencies of the resonant bending wave modes may thus be such that there are substantially minimal clusterings and disparities of spacing of the frequencies.

In particular, the properties of the acoustic radiator may be chosen to distribute the lower frequency resonant bending wave modes substantially evenly in frequency. The distribution of resonant bending wave modes is less dense at lower frequency than at higher frequency and thus the distribution of the lower frequency resonant bending wave modes is particularly important. The lower frequency resonant bending wave modes are preferably the ten to twenty lowest frequency resonant bending wave modes of the acoustic radiator. For an acoustic radiator for use in a keyboard, the lower frequency resonant bending wave modes may all be below 3 kHz.

The resonant bending wave modes associated with each conceptual axis of the acoustic radiator may be arranged to be interleaved in frequency. Each conceptual axis has an associated lowest fundamental frequency (conceptual frequency) and higher modes at spaced frequencies. By interleaving the modes associated with each axis, the substantially even distribution may be achieved. There may be two conceptual axes and the axes may be symmetry axes. For example, for a rectangular acoustic radiator, the axes may be a short and a long axis parallel to a short and a long side of the acoustic radiator respectively. For an elliptical acoustic radiator, the axes may correspond to the major and minor axis of the ellipse. The axes may be orthogonal.

The transducer may be grounded or partially grounded. The transducer may be piezoelectric. The transducer location may be chosen to couple substantially evenly to the resonant bending wave modes. In particular, the transducer location may be chosen to couple substantially evenly to lower frequency resonant bending wave modes. In other words, the transducer may be mounted at a location spaced away from nodes (or dead spots) of as many lower frequency resonant modes as possible. Thus the transducer may be at a location where the number of vibrationally active resonance anti-nodes is relatively high, and conversely the number of resonance nodes is relatively low. Any such location may be used, but the most convenient locations are the near-central locations between 38% to 62% along each of the length and width axes of the panel, but off-central. Specific locations found suitable are at 3/7, 4/9 or 5/13 of the distance along the axes; a different ratio for the length axis and the width axis is preferred.

The acoustic radiator may have selected values of certain physical parameters which enable the acoustic radiator to sustain and propagate input vibrational energy in a predetermined frequency range by a plurality of resonant bending wave modes in a least one operative area extending transversely of thickness such that the frequencies of the resonant bending wave modes along at least two conceptual axes of the operative area are interleaved and spread so that there are substantially minimal clusterings and disparities of spacings of said frequencies, the acoustic radiator when resonating having at least one site at which the number of vibrationally active resonance anti-nodes is relatively high, and a transducer mounted wholly and exclusively on the acoustic radiator at one of said sites on the acoustic radiator, the transducer being capable of vibrating the acoustic radiator in the predetermined frequency range to couple to and excite the resonant bending wave modes in the acoustic radiator and cause the acoustic radiator to resonate and produce an acoustic output.

The acoustic radiator may be in the form of a panel. The panel may be flat and may be lightweight. The material of the acoustic radiator may be anisotropic or isotropic.

Thus, the acoustic radiator may be integrated in the keyboard without adding too much to the size and weight of the keyboard. In contrast, a conventional pistonic loudspeaker is likely to add too much to the size and weight of the keyboard to be practical.

The low form factor of a thin panel speaker makes it uniquely suited to a keyboard, which does not benefit from unnecessary thickness.

In one embodiment, the keyboard may be of the kind wherein the user interface has individual alphanumeric keys which may be electrically connected to associated display and/or printing means. The individual keys forming the keyboard may be supported on the housing, e.g. on a top of the housing. In another embodiment, the user interface may comprise a touchpad which may be supported on the base of the housing. The touchpad may be integral with one or more loudspeakers. Alternatively or additionally, the keyboard ay comprise a flat panel loudspeaker carrying touch pads to form the keys.

The keyboard may also incorporate data readout and/or display units to enhance functionality.

BRIEF DESCRIPTION OF THE DRAWING

Examples that embody the best mode for carrying out the invention are described in detail below and are diagrammatically illustrated in the accompanying drawing, in which.

DETAILED DESCRIPTION

Figure 1:
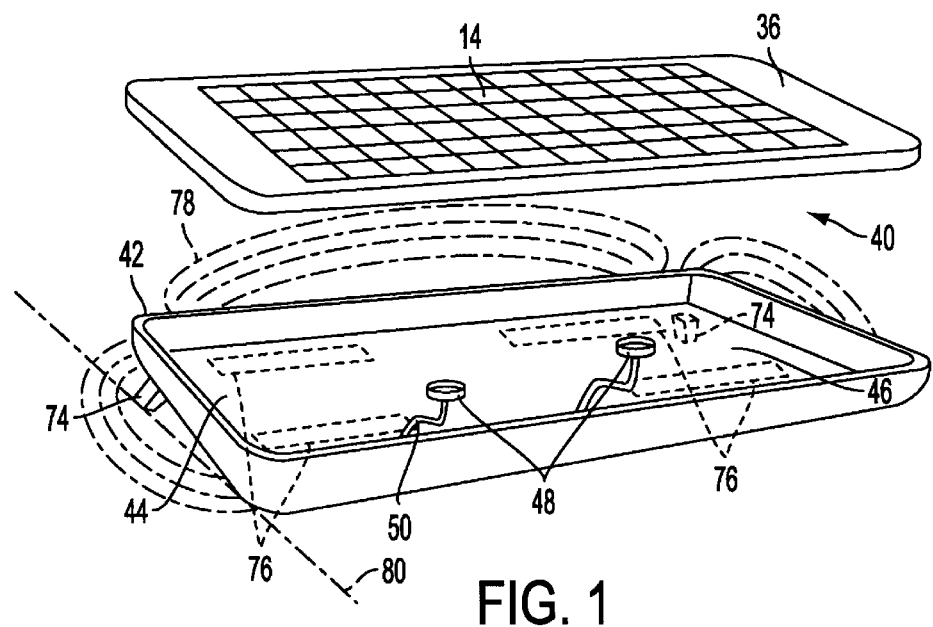
FIG. 1 is an exploded perspective view of a first embodiment of keyboard according to the invention.

In FIG. 1 there is shown a keyboard (40) comprising a housing (42) formed as a shallow tray. A lid or top (36) is attached to the housing and supports individual alphanumeric keys (14). The base (44) of the housing (42) supports a loudspeaker comprising a panel (46) to which two transducers (exciters) (48) are attached. The loudspeaker may be supported on resilient suspension pads (47) at its edges. An acoustic signal is inputted to the exciters via wires (50) to induce vibration of the loudspeaker /(46) to produce an acoustic output.

There are slots (76) in the base (44) so that sound is transmitted from the loudspeaker through the base (44). Although the acoustic output is mainly radiated to the underside, the keyboard is raised on rear legs (74) away from the plane (80) of the desk. This usual offset stance allows the sound energy to circulate quite effectively to the user as shown by the alternate dotted and dashed lines (78). In particular, the sound energy may be reflected by the desk or keyboard support. Single and multi-signal channel operation is envisaged. The rear legs (74) may take any suitable form, e.g., fixed projections integrally moulded with the base (44), as illustrated, or attached by screws or other means; or hinged legs that can be compactly folded against the base when the keyboard is not used and is to be stored away.

Figure 2:
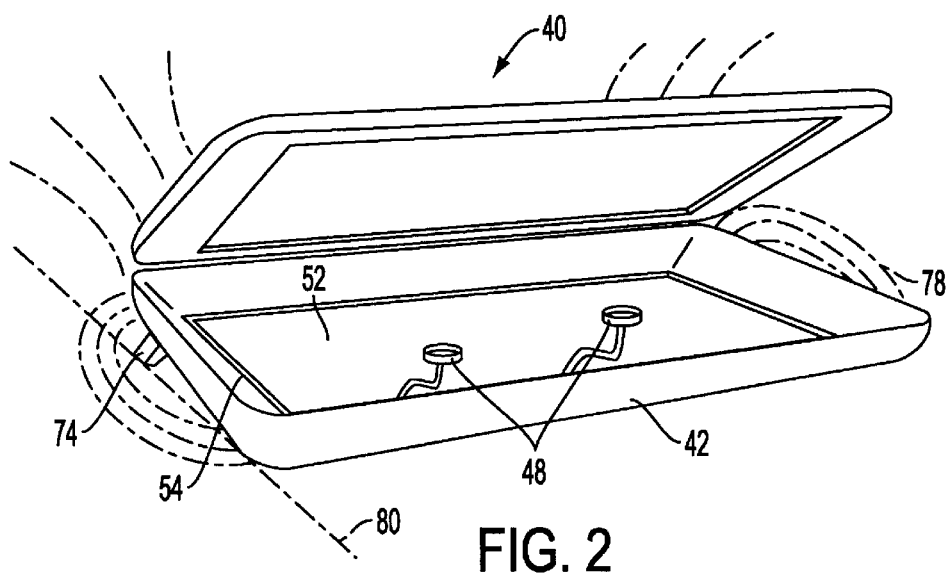
FIG. 2 is an exploded perspective view of a second embodiment of keyboard according to the invention.

FIG. 2 shows a keyboard (40) similar to that in FIG. 1. A loudspeaker comprising a panel (52) and two exciters (48) mounted on the panel is carried by the housing (42) and mounted in an aperture in the base (44) of the housing. A resilient suspension (54) surrounds the loudspeaker and supports the loudspeaker in the aperture in the base. Examples of the types of suspension that may be used are disclosed in parent application Ser. No. 08/707,012. The loudspeaker is thus part of the casework of the keyboard. The base (44) may be formed with more than one aperture to accommodate additional discrete distributed mode loudspeaker units to radiate by reflection as above in FIG. 1.

As in FIG. 1, the keyboard is raised on rear legs (74) away from the plane (80) of the desk. The sound energy circulates as shown by the alternate dotted and dashed lines (78).

Figure 3:
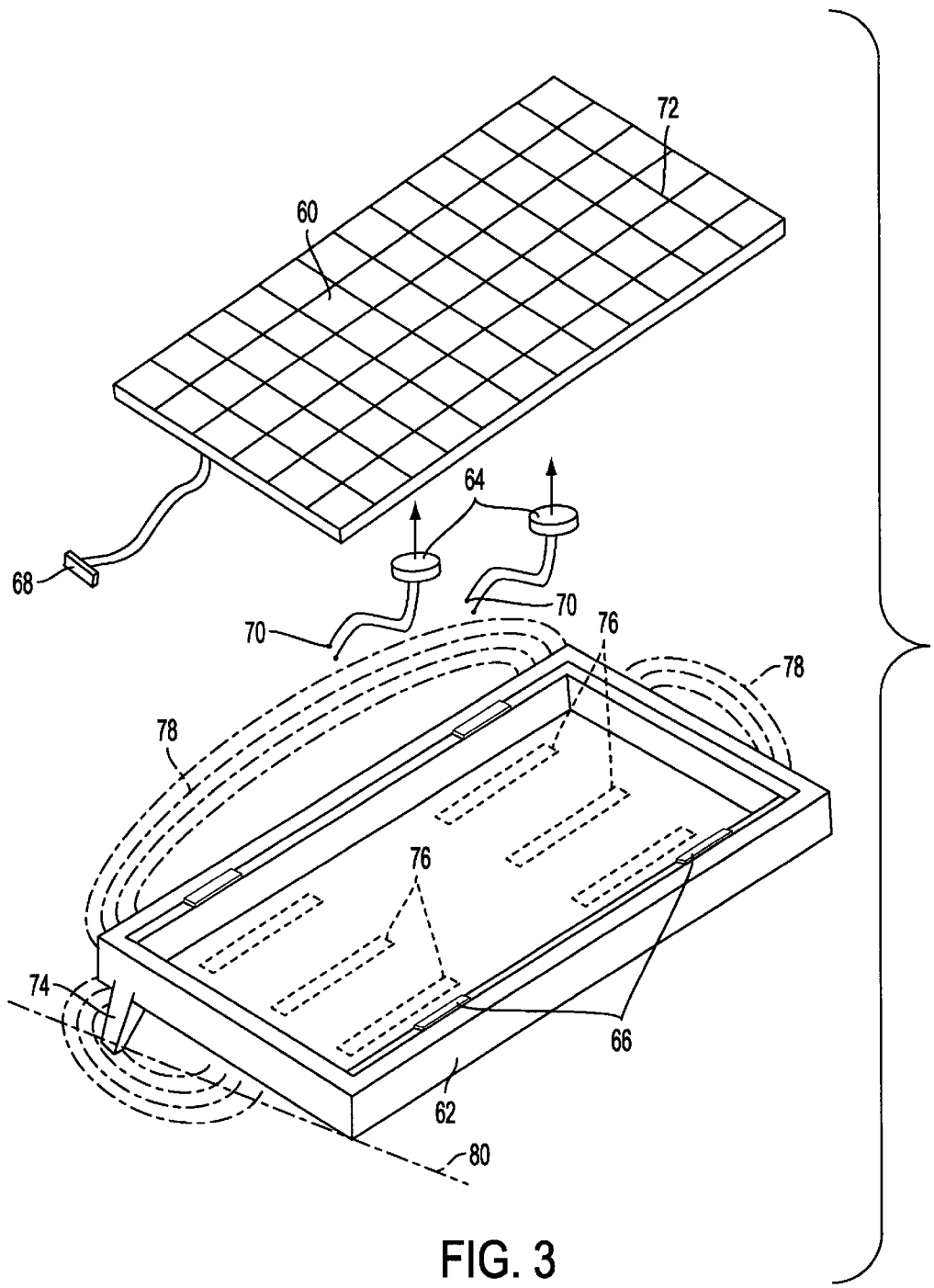
FIG. 3 is an exploded perspective view of a third embodiment of keyboard according to the invention.

FIG. 3 shows a keyboard comprising a touchpad (60) and a housing or casing (62) in the form of a shallow tray. The keyboard comprises a loudspeaker comprising a panel (72) which is integral with the touchpad (60) and a pair of exciters (64). Data is outputted from the touchpad via an output terminal (68) and an acoustic signal is fed to the exciters (64) via wires (70). The touchpad/loudspeaker is supported by the housing (62) which forms a loudspeaker enclosure. The touchpad/loudspeaker is supported on resilient suspension pads (66).

The keyboard is raised on rear legs (74) away from the plane (80) of the desk. Furthermore, slots (76) are provided in the base (44) so that sound is transmitted from the loudspeaker through the base (44). Sound energy circulates through the slots (76) and is reflected off the desk to the user as shown by the alternate dotted and dashed lines (78).

Various modifications will be apparent to those skilled in the art without departing from the scope of the invention, which is defined by the appended claims.

What is claimed is:

1. A keyboard comprising:
   a housing comprising a base and support means for supporting the base above a work surface on which the keyboard is placed to define a gap between the base and the work surface, a user interface carried by the housing above the base, and a bending wave loudspeaker positioned in the housing so that its acoustic output is transmitted to a user via the gap, the loudspeaker comprising an acoustic radiator capable of supporting bending waves and a transducer mounted on the acoustic radiator to excite bending waves in the acoustic radiator to produce an acoustic output.

2. A keyboard according to claim 1, wherein the acoustic radiator is in the form of a panel.

3. A keyboard according to claim 2, wherein the panel is flat.

4. A keyboard according to claim 1, wherein the loudspeaker is a resonant bending wave mode loudspeaker comprising an acoustic radiator capable of supporting resonant bending wave modes, and a transducer mounted on the acoustic radiator to excite resonant bending wave modes in the acoustic radiator to produce an acoustic output.

5. A keyboard according to claim 4, wherein the properties of the acoustic radiator are chosen to distribute the resonant bending wave modes substantially evenly in frequency.

6. A keyboard according to claim 5, wherein the resonant bending wave modes associated with a first conceptual axis of the acoustic radiator are arranged to be interleaved in frequency with the resonant bending wave modes associated with a second conceptual axis of the acoustic radiator.

7. A keyboard according to claim 6, wherein the transducer location couples substantially evenly to the resonant bending wave modes.

8. A keyboard according to claim 7, wherein the acoustic radiator is in the form of a panel.

9. A keyboard according to claim 8, wherein the panel is flat.

10. A keyboard according to claim 2, wherein the loudspeaker is integral with the base of the housing.

11. A keyboard according to claim 2, wherein the loudspeaker is supported in the base of the housing.

12. A keyboard according to claim 2, wherein the housing further comprises side walls and a top which together with the base define a cavity in the housing and the loudspeaker is supported in the housing.

13. A keyboard according to claim 12, wherein the base of the housing is acoustically transparent to allow acoustic output from the loudspeaker to be transmitted to a user.

14. A keyboard according to claim 13, wherein the base of the housing comprises a grid.

15. A keyboard according to claim 2, wherein the loudspeaker is supported on a resilient mounting.

16. A keyboard according to claim 1, wherein the loudspeaker is integral with the base of the housing.

17. A keyboard according to claim 1, wherein the loudspeaker is supported in the base of the housing.

18. A keyboard according to claim 1, wherein the housing further comprises side walls and a top which together with the base define a cavity in the housing and the loudspeaker is supported in the housing.

19. A keyboard according to claim 18, wherein the base of the housing is acoustically transparent to allow acoustic output from the loudspeaker to be transmitted to a user.

20. A keyboard according to claim 19, wherein the base of the housing comprises a grid.

21. A keyboard according to claim 1, wherein the loudspeaker is supported on a resilient mounting.

22. A keyboard according to claim 1, wherein the user interface comprises individual alphanumeric keys which are supported on the housing.

23. A keyboard according to claim 1, wherein the user interface comprises a touchpad and the touchpad is integral with the loudspeaker.

24. A keyboard according to claim 1, wherein the keyboard comprises two loudspeakers.

25. A keyboard comprising:

a housing comprising a base and support means for supporting the base above a work surface on which the keyboard is placed to define a gap between the base and the work surface, a user interface carried by the housing above the base, and a bending wave loudspeaker positioned in the housing so that its acoustic output is transmitted to a user via the gap, the loudspeaker comprising:

an acoustic radiator having selected values of certain physical parameters which enable the radiator to sustain and propagate input vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the radiator when resonating having at least one site at which the number of vibrationally active resonance anti-nodes is relatively high; and a transducer mounted on the radiator at one of said sites on the radiator, the transducer being capable of vibrating the radiator in the predetermined frequency range to couple to and excite the resonant bending wave modes in the radiator and cause the radiator to resonate and produce an acoustic output.

26. A keyboard according to claim 25, wherein the acoustic adiator is in the form of a panel.

27. A keyboard according to claim 26, wherein the panel is flat.

28. A keyboard according to claim 25, wherein the loudspeaker is integral with the base of the housing.

29. A keyboard according to claim 25, wherein the loudspeaker is supported in the base of the housing.

30. A keyboard according to claim 25, wherein the housing further comprises side walls and a top which together with the base define a cavity in the housing and the loudspeaker is supported in the housing.

31. A keyboard according to claim 30, wherein the base of the housing is acoustically transparent to allow acoustic output from the loudspeaker to be transmitted to a user.

32. A keyboard according to claim 31, wherein the base of the housing comprises a grid.

33. A keyboard according to claim 25, wherein the loudspeaker is supported on a resilient mounting.

34. A keyboard according to claim 25, wherein the user interface comprises individual alphanumeric keys which are supported on the housing.

35. A keyboard according to claim 25, wherein the user interface comprises a touchpad and the touchpad is integral with the loudspeaker.

36. A keyboard according to claim 25, wherein the keyboard comprises two loudspeakers.

* * * * *